(12) United States Patent
Tadmor et al.

(10) Patent No.: US 9,979,905 B2
(45) Date of Patent: May 22, 2018

(54) MULTIMODE PHOTOSENSOR

(71) Applicant: Microsoft Technology Licensing, LLC., Redmond, WA (US)

(72) Inventors: Erez Tadmor, Tel Aviv (IL); Yair Sharf, Aloney Aba (IL); Giora Yahav, Haifa (IL); Amir Nevet, Haifa (IL); David Cohen, Nesher (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days. days.

(21) Appl. No.: 14/943,436

(22) Filed: Nov. 17, 2015

(65) Prior Publication Data

US 2017/0142353 A1    May 18, 2017

(51) Int. Cl.
| | |
|---|---|
| *H04N 5/353* | (2011.01) |
| *H04N 5/232* | (2006.01) |
| *H04N 5/355* | (2011.01) |
| *H04N 5/3728* | (2011.01) |
| *H04N 5/378* | (2011.01) |
| *H04N 5/343* | (2011.01) |

(Continued)

(52) U.S. Cl.
CPC ......... *H04N 5/353* (2013.01); *H04N 5/23245* (2013.01); *H04N 5/343* (2013.01); *H04N 5/3559* (2013.01); *H04N 5/35581* (2013.01); *H04N 5/378* (2013.01); *H04N 5/3722* (2013.01); *H04N 5/3728* (2013.01); *H04N 5/37213* (2013.01)

(58) Field of Classification Search
CPC .... H04N 5/343; H04N 5/37213; H04N 5/347; H04N 5/378; H04N 5/3728; H04N 5/37452; H04N 5/341; H04N 5/3454; H04N 5/3559; H04N 5/37206; H04N 5/3743; H04N 5/23245; H04N 5/3452; H04N 5/2355; H04N 5/3745; H01L 27/14612; H01L 27/14812; H01L 27/14603; H01L 27/14609; H01L 27/14831
USPC ...................................... 250/208.1
See application file for complete search history.

(56) References Cited

U.S. PATENT DOCUMENTS

| | | |
|---|---|---|
| 4,322,752 A | 3/1982 | Bixby |
| 4,837,630 A | 6/1989 | Ueda |
| 4,928,158 A | 5/1990 | Kimata |

(Continued)

FOREIGN PATENT DOCUMENTS

| | | |
|---|---|---|
| CN | 101929859 B | 9/2012 |
| EP | 2698986 | 2/2014 |
| WO | 1997043788 A1 | 11/1997 |

OTHER PUBLICATIONS

International Search Report and Written Opinion dated Jan. 18, 2017 for PCT Application No. PCT/2016/059373.

(Continued)

*Primary Examiner* — Michael Osinski
(74) *Attorney, Agent, or Firm* — A. C. Entis-IP Ltd.

(57) ABSTRACT

A multimode interline charge coupled device having an array of light sensitive pixels, each configured to accumulate photocharge responsive to light incident on the pixel, and a controller configured to allocate a first portion of the pixels to accumulate photocharge responsive to light from a scene during a plurality of exposure periods and allocate a second portion of the pixels to store photocharge accumulated by pixels in the first portion to provide a plurality of images of the scene greater than two.

20 Claims, 8 Drawing Sheets

(51) Int. Cl.
    *H04N 5/372*    (2011.01)
    *H04N 5/3722*   (2011.01)

(56) References Cited

U.S. PATENT DOCUMENTS

| | | | |
|---|---|---|---|
| 5,060,245 A | 10/1991 | Nelson | |
| 5,426,317 A | 6/1995 | Hirota | |
| 5,430,481 A | 7/1995 | Hynecek | |
| 5,565,916 A | 10/1996 | Katayama et al. | |
| 5,774,182 A | 6/1998 | Mutoh et al. | |
| 5,796,433 A | 8/1998 | Dyck | |
| 7,015,965 B2 | 3/2006 | Asada et al. | |
| 7,385,638 B2* | 6/2008 | Parks | H04N 9/045 348/294 |
| 7,508,436 B2* | 3/2009 | Parks | H04N 5/2353 348/296 |
| 7,522,205 B2 | 4/2009 | Parks | |
| 7,796,174 B1 | 9/2010 | Harwit et al. | |
| 7,884,871 B2 | 2/2011 | Smith et al. | |
| 8,274,100 B2* | 9/2012 | Wang | H01L 27/14812 257/225 |
| 8,724,003 B2* | 5/2014 | Parks | H04N 5/343 348/317 |
| 8,878,255 B2 | 11/2014 | Wang | |
| 9,247,170 B2* | 1/2016 | Komori | H04N 5/3745 |
| 9,502,452 B2* | 11/2016 | Kobayashi | H01L 27/14612 |
| 9,621,860 B2* | 4/2017 | Saito | H04N 9/31 |
| 2002/0141002 A1* | 10/2002 | Takano | H04N 9/045 358/513 |
| 2004/0061796 A1 | 4/2004 | Honda | H04N 1/00 348/297 |
| 2005/0103979 A1* | 5/2005 | Heigel | H04N 5/2357 250/208.1 |
| 2005/0104985 A1* | 5/2005 | Abe | H04N 3/1562 348/308 |
| 2005/0270391 A1* | 12/2005 | Watanabe | H04N 5/23293 348/294 |
| 2006/0050165 A1* | 3/2006 | Amano | H04N 3/155 348/320 |
| 2007/0139545 A1* | 6/2007 | Parks | H04N 3/1562 348/311 |
| 2008/0018767 A1* | 1/2008 | Parks | H01L 27/14621 348/311 |
| 2008/0179490 A1* | 7/2008 | Ohno | G01J 1/4228 250/201.1 |
| 2009/0021612 A1* | 1/2009 | Hamilton, Jr. | H04N 5/3452 348/249 |
| 2009/0127438 A1* | 5/2009 | Barbier | H04N 5/335 250/208.1 |
| 2011/0075001 A1 | 3/2011 | Border et al. | |
| 2011/0090385 A1* | 4/2011 | Aoyama | H01L 27/14603 348/308 |
| 2011/0157448 A1 | 6/2011 | Kureta et al. | |
| 2012/0025275 A1* | 2/2012 | Wang | H01L 27/14812 257/229 |
| 2014/0049676 A1* | 2/2014 | Parks | H04N 5/343 348/311 |
| 2014/0085518 A1* | 3/2014 | Fox | H04N 5/3743 348/296 |
| 2014/0125766 A1 | 5/2014 | Cohen et al. | |
| 2014/0184847 A1* | 7/2014 | Fujita | H04N 5/37206 348/222.1 |
| 2014/0340554 A1* | 11/2014 | Ishii | H04N 5/343 348/302 |
| 2015/0008493 A1* | 1/2015 | Ni | H01L 27/14616 257/292 |
| 2016/0094778 A1* | 3/2016 | Okubo | H04N 5/23212 348/349 |
| 2016/0094797 A1* | 3/2016 | Yoon | H04N 5/35554 348/294 |
| 2016/0150128 A1* | 5/2016 | Shaffer | H04N 3/1543 348/295 |

OTHER PUBLICATIONS

Ben-Ezra, Moshe, "Light Efficient Flutter Shutter", Published on: Aug. 2012, Available at: http://arxiv.org/ftp/arxiv/papers/1509/1509.01220.pdf.

Spurr, et al., "ICRF Handbook of Genome Analysis", In Publication of Wiley-Blackwell, Feb. 1998, 2 pages.

Allen, Elizabeth, "The Manual of Photography and Digital Imaging", In Publication of Focal Press, Dec. 3, 2010, 1 page.

Etoh, et al., "Toward One Giga Frames per Second—Evolution of in Situ Storage Image Sensors", In Proceedings of Sensors, vol. 13, Issue 4, Apr. 8, 2013, pp. 4640-4658.

"Sensor Comparison II: Interline Scan, Frame Transfer & Full Frame", Published on: Oct. 2008, Available at: http://www.adept.net.au/news/newsletter/200810-oct/sensors.shtml.

"Second Written Opinion Issued in PCT Application No. PCT/US2016/059373", dated Oct. 16, 2017, 7 Pages.

"International Preliminary Report on Patentability Issued in PCT Application No. PCT/US2016/059373", dated Jan. 26, 2018, 8 Pages.

\* cited by examiner

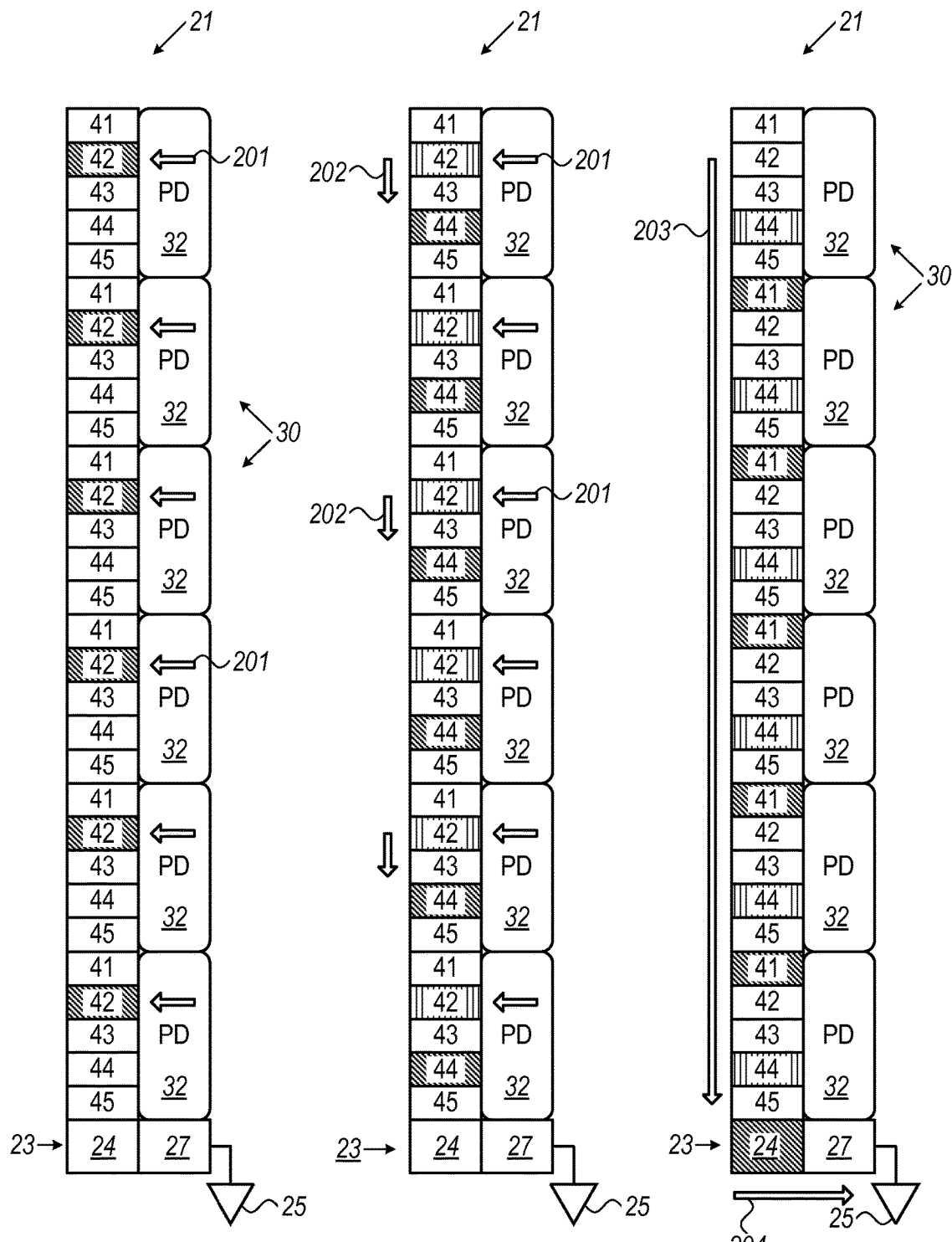

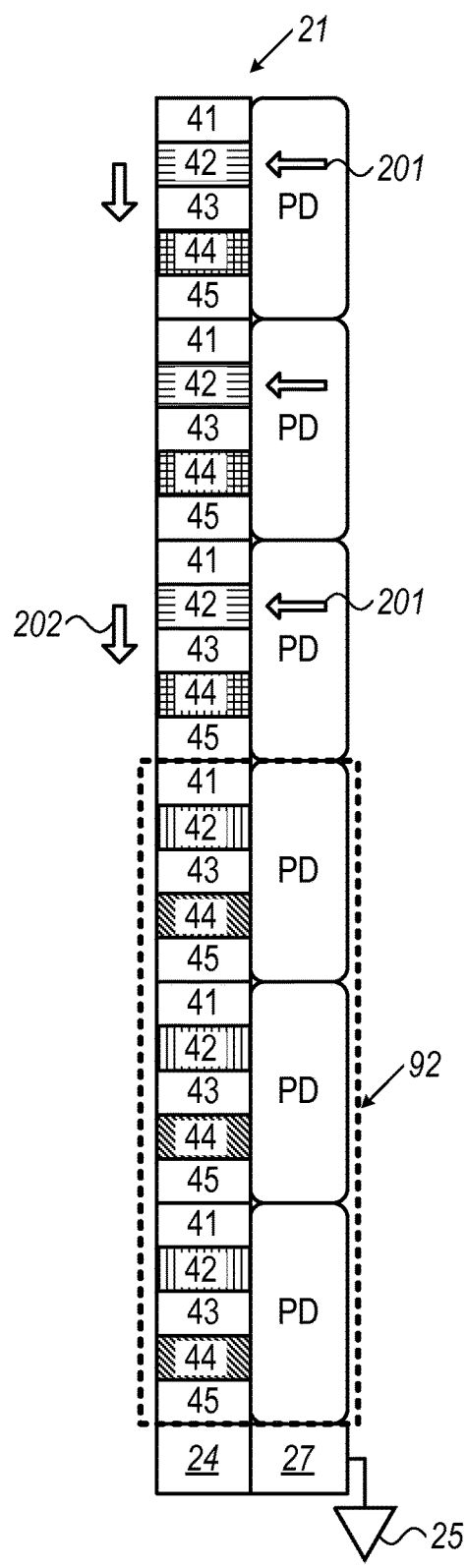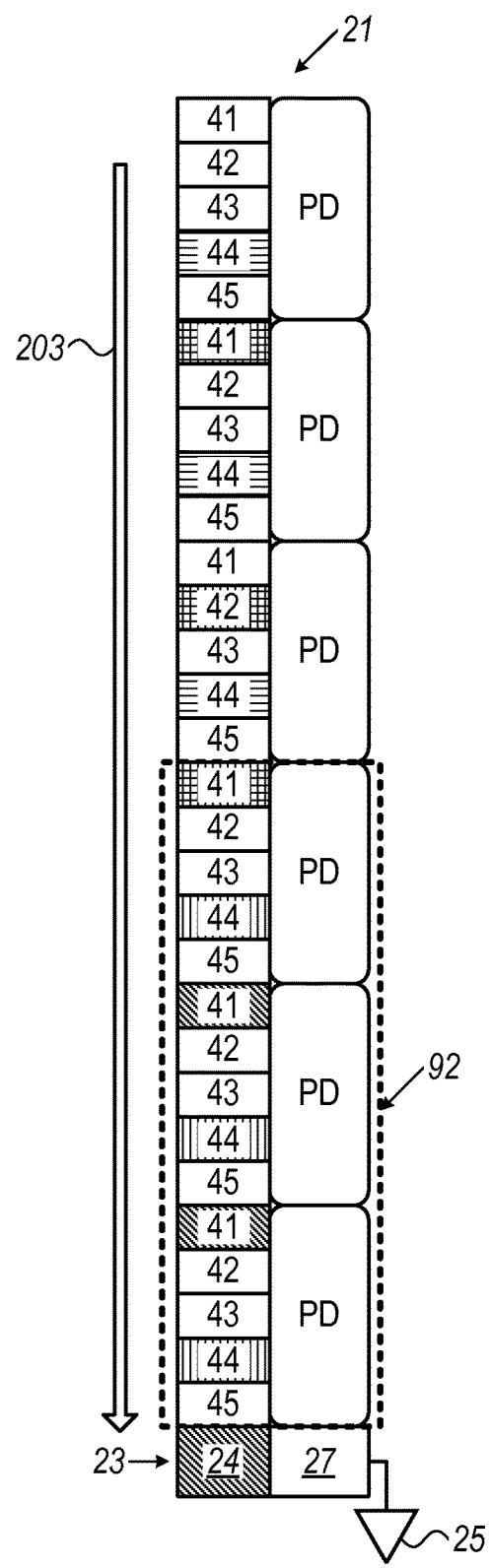
FIG. 2D
FIG. 2E ial features. Dimensions of components and features shown in the figures are chosen for convenience and clarity of presentation and are not necessarily shown to scale.

MULTIMODE PHOTOSENSOR

BACKGROUND

A camera may comprise photosensor, such as a CCD (charge coupled device) or CMOS (complementary metal Oxide on Silicon) photosensor and optics that collects and focuses light from a scene that the camera images onto the photosensor during an exposure period of the camera to acquire an image of the scene. The photosensor generally comprises an array of "horizontal" rows and "vertical" columns of light sensitive pixels that register the light focused by the camera optics onto the photosensor. Amounts of light registered by the pixels are determined to provide the image of the scene.

A pixel in the photosensor registers incident light from a feature in the scene that the optics focuses on the pixel by accumulating negative or positive electric charge provided by electrons or holes respectively from electron-hole pairs that the incident light generates in the pixel. The charge provided by electrons or holes from electron-hole pairs may be referred to generically as "photocharge". Camera photosensors are typically configured so that their pixels accumulate electrons, conventionally also referred to as "photoelectrons", and thereby negative photocharge originating from electron-hole pairs, rather than holes, and thereby positive photocharge to register incident light. Converting an amount of photocharge that a pixel in the photosensor accumulates responsive to incident light to a voltage, hereinafter also referred to as a readout voltage, provides a measurement of an amount of the incident light that the pixel registers. A collection of the readout voltages referred to as a frame of the photosensor may be used to provide and image of the scene. A CMOS photosensor may include circuitry in each pixel of the photosensor to convert photocharge to readout voltage. An interline CCD photosensor transfers photocharge accumulated by each of the pixels along an array of photocharge storage capacitors to readout circuitry that converts the photocharge to a readout voltage. Converting photocharge accumulated by a pixel to a readout voltage may be referred to as "reading" the pixel, or "reading" the photocharge.

SUMMARY

An aspect of an embodiment of the invention, relates to providing an interline CCD photosensor, hereinafter also referred to as a multimode interline CCD (MUMIT-CCD) photosensor, having a controller configured to operate the photosensor selectively in a holistic mode or in a partition mode. In the holistic mode the controller shutters the photosensor ON for an exposure period during which substantially all the pixels in the photosensor register light from a scene and controls the photosensor to provide a frame of the photosensor usable to provide an image of the scene that comprises readout voltages for all the pixels. In a partition mode the controller partitions light sensitive pixels in the photosensor to allocate at least one first region of the photosensor comprising a portion of the light sensitive pixels to register light from a scene that is incident on the photosensor. The controller allocates at least one second region of the photosensor comprising a different portion of the light sensitive pixels in the photosensor to store photocharge generated by pixels in the at least one first region. The controller controls the photosensor to transfer the photocharge stored in the pixels in the at least one second region to readout circuitry to convert the photocharge to readout voltages and provide an image of the scene. A set of readout voltages, in accordance with an embodiment of the disclosure that is provided by a portion of the light sensitive pixels may be referred to as a partial frame of the photosensor. Allocating a portion of the pixels to register light, and a remaining portion of the pixels to store photocharge accumulated by the portion that registers light, configures the photosensor so that it is controllable to provide more than two partial frames of the photosensor, and thereby acquire more than two images of the same scene, in relatively rapid succession.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same numeral in all the figures in which they appear. A label labeling an icon or other graphical indicia representing a given feature of an embodiment of the invention in a figure may be used to reference the given feature. Dimensions of components and features shown in the figures are chosen for convenience and clarity of presentation and are not necessarily shown to scale.

FIGS. 1B-1D illustrate operation of the MUMIT-CCD photosensor in a holistic mode to acquire two images of a scene in relatively rapid succession, in accordance with an embodiment of the invention;

FIGS. 2A-2E schematically illustrate operation of the MUMIT-CCD photosensor in an equal partition mode in which equal numbers of pixels are allocated to register light and store photocharge to acquire four images of a scene in relatively rapid succession, in accordance with an embodiment of the invention;

DETAILED DESCRIPTION

Figure 1A:
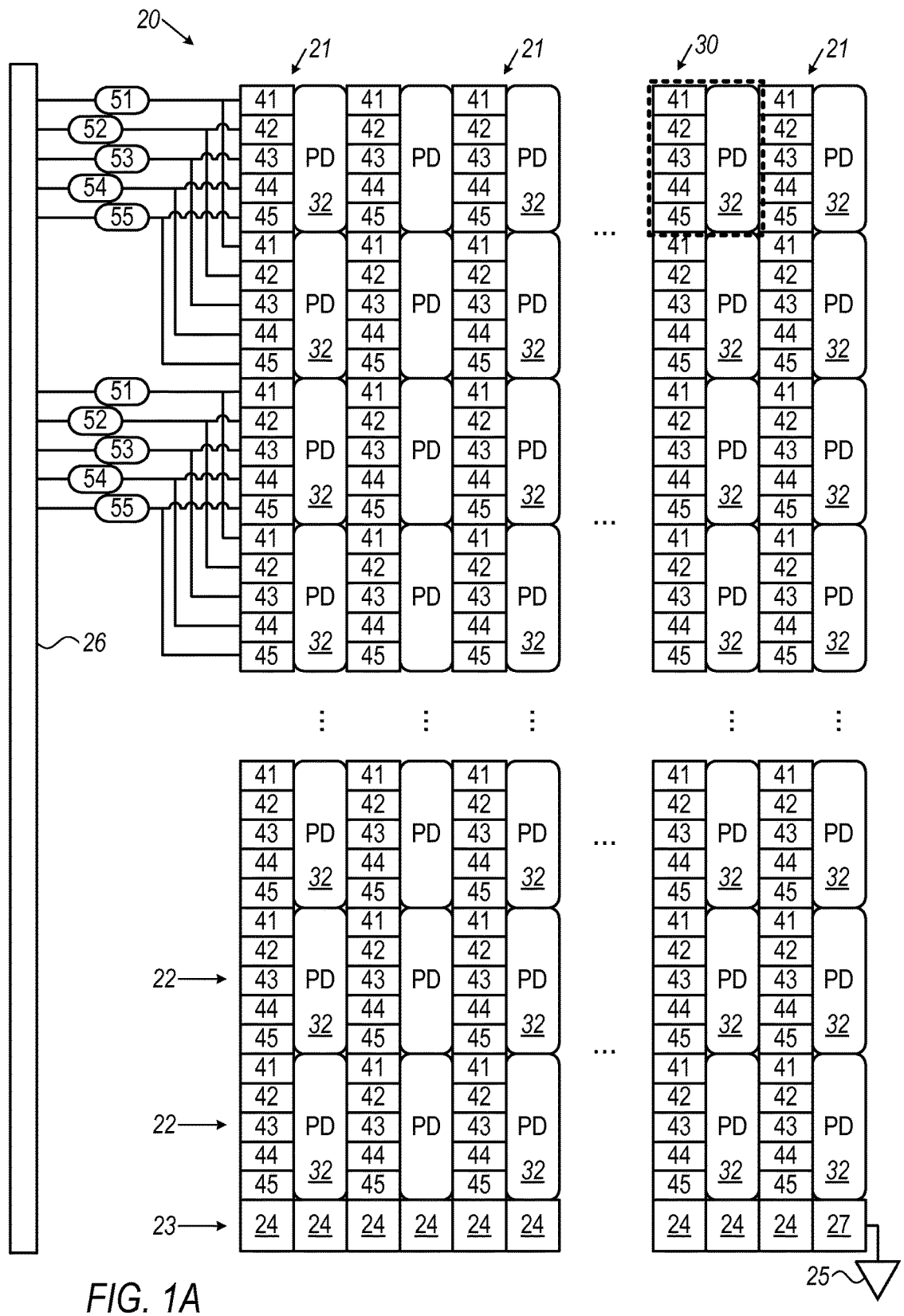
FIG. 1A schematically shows a MUMIT-CCD photosensor, in accordance with an embodiment of the invention.

In the following detailed description, structure of, an optionally five phase, MUMIT-CCD photosensor in accordance with an embodiment of the disclosure is discussed with reference to FIG. 1A. The figure schematically shows rows and columns of pixels in the photosensor and a controller that controls mode of operation of the photosensor. The controller electrifies transfer electrodes in the photosensor with configurations of five independently controllable voltages for five phase clocking to control mode of operation of the MUMIT-CCD and accumulation and readout of photocharge that pixels in the photosensor generate responsive to light from a scene to provide an image of the scene. The MUMIT-CCD photosensor shown in the figures and discussed below is assumed, by way of example, to accumulate photoelectrons to register light from a scene.

Operation of the MUMIT-CCD shown in FIG. 1A and operating in a holistic mode is schematically illustrated in, and discussed with reference to, FIGS. 1B-1D. Each FIG. 1B-1D schematically shows a column of pixels in the MUMIT-CCD photosensor shown in FIG. 1A during operation in the holistic mode at a different stage of generation of photocharge to register light from a scene and acquire two images of the scene in relatively rapid succession.

Discussion of the MUMIT-CCD operating in a partition mode, referred to as an "equal partition mode", for which the controller allocates equal numbers of pixels to register light and to store photocharge, is discussed with reference to FIGS. 2A-2E. Each FIG. 2A-2E schematically shows a column of pixels in the MUMIT-CCD photosensor shown in FIG. 1A during operation in the equal partition mode at a different stage of generation of photocharge to register light from a scene and acquire four images of the scene in relatively rapid succession.

FIGS. 3A-3E schematically illustrate the MUMIT-CCD operating in a partition mode, referred to as a "⅔-⅓ compression" mode, for which two thirds of the pixels generate photocharge responsive to light from a scene, and one third of the pixels store the photocharge generated by the two thirds of the pixels in a compressed format. Each FIG. 3A-3E schematically shows a column of pixels in the MUMIT-CCD photosensor during operation in the ⅔-⅓ compression mode at a different stage of generation of photocharge to register light from a scene incident on the photosensor and acquire three images of the scene in relatively rapid succession.

FIGS. 4A-4E illustrate the MUMIT-CCD operating in a "partial readout" mode for which pixels allocated for storing photocharge are read out before the pixels store photocharge for a complete image of the scene. A complete image of a scene may refer to an image generated responsive to photocharge accumulated by substantially all the pixels in the MUMIT-CCD photosensor that the photosensor controller allocates for registering light from a scene. The partial readout mode schematically shown in FIGS. 4A-4E, which may be referred to as a "⅔-⅓ partial readout", is a mode for which two thirds of the pixels generate photocharge responsive to light from a scene and one third of the pixels store the photocharge generated by the two thirds of the pixels. In the ⅔-⅓ partial readout mode the photosensor operates to acquire four partial frames of the photosensor and four corresponding images of the scene in rapid succession.

FIG. 1A schematically shows a simplified top view of a portion of a five phase MUMIT-CCD photosensor 20, also referred to as MUMIT-CCD 20, in accordance with an embodiment of the disclosure. MUMIT-CCD 20 comprises columns 21 and rows 22 of light sensitive pixels 30, one of which pixels is indicated by a dotted boundary for convenience of identity, a row 23 of readout capacitors 24, and a readout amplifier 25 formed in or on a suitable substrate (not shown), in accordance with an embodiment of the disclosure. Readout amplifier 25 is optionally connected to an end readout capacitor 27 in row 23. A controller 26 controls MUMIT-CCD 20 to operate selectively in a holistic mode or a partition mode of optionally a plurality of partition modes to register light from a scene incident on the photosensor and acquire images of the scene as discussed below.

Features of MUMIT-CCD photosensor 20 shown in FIG. 1A and figures that follow are not necessarily at a same depth in the MUMIT-CCD photosensor. The figures show schematic projections of the features onto a top surface, assumed to lie in the page of the figures, of MUMIT-CCD 20 that indicate relative lateral locations of the features. Shapes of the features may be different from the shapes shown in the figures and are chosen for convenience of presentation. The shapes are not necessarily shapes of the features in a practical, physical MUMIT-CCD photosensor in accordance with an embodiment of the disclosure.

Each pixel 30 optionally comprises a photodiode (PD) 32 that generates photoelectrons responsive to light incident on the photodiode and five photoelectron storage capacitors, 41, 42, 43, 44, and 45. Each storage capacitor, 41-45, is overlaid by its own transfer electrode (not shown), which may be referred to as a "transfer gate" or "gate". The substrate on which components of MUMIT-CCD 20 are formed is optionally a heavily n-doped silicon substrate, and components of a pixel 30 may be formed in and/or on an epitaxial p-doped layer (not shown) formed on the substrate. Photodiode 32 may comprise a depletion zone generated at a junction of an n-doped region (not shown) formed in the p-doped epitaxial layer. Storage capacitors 41-45 may be portions of a buried n-doped channel. Transfer gates overlying storage capacitors 41-45 are connected to contact pads 51-55 respectively, and each contact pad 51-55 is, optionally as schematically shown by way of example in FIG. 1A, connected to transfer gates of two homologous capacitors 41-45 in a pair of adjacent pixels 30. The transfer gates may be formed using any of various suitable conducting materials such as a metal or polysilicon that is opaque to light so that, in addition to providing electrical connection to their respective capacitors, the transfer gates prevent incident light from generating photocharge in the capacitors. Photodiodes 32 may be overlaid by electrodes (not shown), hereinafter also referred to as "photodiode electrodes", that are transparent to light for which MUMIT-CCD 20 is intended to image. Photodiode electrodes may be electrified by controller 26 to back bias the photodiodes to a desired potential. For convenience of presentation, a contact pad 51-55 connected to a capacitor's transfer gate may be said to be connected to the capacitor. Controller 26 electrifies contact pads 51-55 to apply configurations of transfer voltages to storage capacitors 41-45 to control readout of photocharge that photodiodes 32 generate responsive to light from a scene incident on MUMIT-CCD 20.

In an embodiment, controller 26 may shutter MUMIT-CCD 20 OFF, and substantially insensitive to incident light, by applying a voltage $V_{OFF}$ to the substrate of MUMIT-CCD so that photoelectrons generated in photodiode 32 of a pixel 30 responsive to incident light, drain off to the substrate and are discarded. Controller 26 may shutter MUMIT-CCD 20 ON, and sensitive to light for an exposure period during which pixels 30 register light from a scene, by applying a voltage $V_{ON}$ to the substrate and a positive voltage, $V_{g++}$, to a transfer gate of a storage capacitor 41, 42, 43, 44, or 45 of each pixel 30. $V_{ON}$ and $V_{g++}$ have magnitudes and polarities that operate to transfer photocharge generated in the pixel's photodiode 32 responsive to light from the scene to the storage capacitor for storage and subsequent transfer to readout amplifier 25 for conversion to voltage.

Controller 26 transfers the photocharge stored in the storage capacitors in each pixel 30 to readout amplifier 25 by applying appropriate sequences of positive and negative voltages $V_{g+}$ and $V_{g-}$ respectively to transfer gates of storage capacitors 41-45 in the pixels. Controller 26 may control voltages to contact pads connected to storage capacitors in different pairs of pixels 30 independently of each other. The applied sequences of voltages $V_{g+}$ and $V_{g-}$ may operate to transfer photocharge in each of the storage capacitors in a same row of the storage capacitors, from storage capacitor row to storage capacitor row, "vertically downwards" along pixel columns 21 to deposit the photocharge into readout capacitors 24 in readout row 23. After depositing photocharge from a given row of storage capacitors 41, 42, 43, 44, or 45 into readout capacitors 24 in readout row 23, controller 26 applies voltages to readout capacitors 24 to transfer the amounts of photocharge deposited in each of the readout capacitors horizontally along readout row 23 from one to the other of readout capacitors 24 to readout amplifier 25 for conversion of each amount to a readout voltage. The readout voltages that readout amplifier 26 generates from the amounts of photocharge it receives are stored in a suitable memory (not shown) as a frame of MUMIT-CCD 20 to provide an image of the scene.

$V_{OFF}$ may be voltage that is greater than a voltage that controller 26 applies to electrodes overlying photodiodes 32 to back-bias the photodiodes, and less than a voltage that drains photoelectrons that may be stored in a storage capacitor 41, 42, 43, 44, or 45 to the substrate. $V_{ON}$ may be a voltage greater than $V_{OFF}$, but less than a voltage that back-biases photodiodes 32, and less than voltage $V_{g++}$ that controller 26 applies to a given storage capacitor 41, 42, 43, 44, or 45 in a pixel 30 to transfer photocharge from the pixel's photodiode 32 to the given storage capacitor. Positive voltage $V_{g+}$ that controller 26 applies to a storage capacitor 41, 42, 43, 44, or 45 of a pixel 30 when transferring photocharge vertically to readout row 23 may be sufficiently less than $V_{g++}$ to prevent transfer of photoelectrons from the pixel's photodiode 32 during vertical transfer. By way of numerical example, in an embodiment of the disclosure $V_{OFF}$ and $V_{ON}$ may be equal respectively to about 15V (volts) and 5V volts, and $V_{g++}$, $V_{g+}$, and $V_{g-}$, may be respectively equal to about 10 V volts, 0 volts and −5V.

FIGS. 1B-1D schematically illustrate generation, storage, and transfer of photocharge in a portion of an example column 21 of the plurality of pixel columns 21 comprised in MUMIT-CCD photosensor 20 responsive to light from a scene (not shown) during operation of the photosensor in a holistic mode, in accordance with an embodiment of the disclosure. Operating in the holistic mode MUMIT-CCD photosensor 20 acquires two images of the scene in relatively rapid succession. The generation, storage, and transfer of photocharge schematically illustrated for the portion of example column 21 shown in FIGS. 1B-1D is representative of what may occur simultaneously in all columns 21 of MUMIT-CCD during operation in the holistic mode to image the scene. In the discussion that follows the portion of example column 21 shown in FIGS. 1B-1D and figures that follow may be referred to as column 21 or example column 21.

FIG. 1B schematically shows an example column 21 of pixels 30 during a first exposure period of MUMIT-CCD when controller 26 (FIG. 1A) controls MUMIT-CCD 20 to generate and acquire photocharge for a first of two images of the scene. Controller 26 has applied a voltage $V_{ON}$ to the substrate of MUMIT-CCD 20, a voltage $V_{g++}$ to storage capacitor 42, and optionally a negative voltage $V_{g-}$ to storage capacitors 41, 43, 44, and 45 in each pixel 30. As a result, during the first exposure period, photocharge generated in photodiode 32 of each pixel 30 is transferred to the pixel's storage capacitor 42, and the storage capacitor accumulates a first amount of photocharge for providing the first image of the scene. A horizontal block arrow 201 indicates transfer of photocharge from photodiode 32 in each pixel 30 in column 21 to the pixel's storage capacitor 42. Photocharge accumulated in storage capacitor 42 of each pixel 30 during the first exposure period is schematically represented by a hatching pattern shading the storage capacitors.

Subsequent to accumulating first amounts of photocharge in storage capacitors 42 of pixels 30, controller 26 transfers the accumulated photocharge in each pixel from the pixel's storage capacitor 42 to the pixel's storage capacitor 44. Optionally, the controller transfers photocharge from storage capacitors 42 to storage capacitors 44 by applying a "Sequence A" of optionally four voltage configurations, VC1, VC2, VC3, and VC4, to storage capacitors 41-45. The voltages in the configurations are given in the following TABLE A, in which rows in the table are labeled by the voltage configuration identifiers, VC1, VC2, VC3, and VC4, and the columns in the table are labeled by the storage capacitor labels 41-45. In the table, symbols ++, +, and −, respectively represent applied voltages $V_{g++}$, $V_{g+}$, and $V_{g-}$, discussed above. A voltage in a cell of TABLE A located at an intersection of a row labeled by a given voltage configuration and a column labeled by a label of a given storage capacitor is the voltage that controller 26 applies to the given storage capacitor when applying the given voltage configuration to storage capacitors 41-45.

TABLE A

|     | 41 | 42 | 43 | 44 | 45 |
| --- | --- | --- | --- | --- | --- |
| VC1 | −  | ++ | −  | −  | −  |
| VC2 | −  | +  | +  | −  | −  |
| VC3 | −  | −  | +  | +  | −  |
| VC4 | −  | −  | −  | +  | −  |

Following transfer of photocharge from storage capacitors 42 in pixels 30 to storage capacitors 44 in the pixels, controller 26 initiates a second exposure period, which may have duration different from that of the first exposure period. During the second exposure period controller 26 again applies a voltage $V_{g++}$ to storage capacitor 42 in each pixel 30 to accumulate for the second image of the scene photocharge generated by the pixel's photodiode 32 responsive to light from the scene. FIG. 1C schematically shows example column 21 during the second exposure period. Small vertical block arrows 202 in FIG. 1C represent transfer of photocharge accumulated in storage capacitors 42 during the first exposure period to storage capacitors 44. A horizontal block arrow 201 in each pixel 30 of column 21 indicates transfer of photocharge during the second exposure period from the pixel's photodiode 32 to the pixel's storage capacitor 42. An amount of photocharge accumulated in storage capacitor 42 of each pixel 30 during the second exposure period is schematically represented by shading of storage capacitors 42 with a hatching pattern different from that representing photocharge accumulated during the first exposure period.

Following accumulation of first and second amounts of photocharge by pixels 30 during the first and second exposure periods respectively, controller 26 applies voltages to storage capacitors 41-45 to transfer the photocharge accumulated in storage capacitors 42 and 44 in pixels 30 vertically "downwards" to deposit the photocharge into readout capacitors 24 in readout row 23 for subsequent transfer to, and conversion by readout amplifier 25 to readout voltages. Optionally, the controller transfers photocharge from storage capacitors 42 and 44 vertically to readout capacitor row 23 by repeatedly applying a Sequence B of voltage configurations, VC1, VC2, VC3, . . . , VC11, shown in a TABLE B below, to storage capacitors 41-45. Application of the voltage configurations transfers amounts of photocharge in all storage capacitors in a same row of storage capacitors 41-45 substantially simultaneously towards row 23 for deposit in the readout capacitors 24.

TABLE B

|      | 41 | 42 | 43 | 44 | 45 |
|------|----|----|----|----|----|
| VC1  | −  | +  | −  | +  | −  |
| VC2  | −  | +  | −  | +  | +  |
| VC3  | −  | +  | −  | −  | +  |
| VC4  | −  | +  | +  | −  | +  |
| VC5  | −  | −  | +  | −  | +  |
| VC6  | +  | −  | +  | −  | +  |
| VC7  | +  | −  | +  | −  | −  |
| VC8  | +  | −  | +  | +  | −  |
| VC9  | +  | −  | −  | +  | −  |
| VC10 | +  | +  | −  | +  | −  |
| VC11 | −  | +  | −  | +  | −  |

FIG. 1D schematically shows column 21 after a first application of voltage Sequence B to storage capacitors 41-44, which transfers photocharge in storage capacitors 42 and 44 in example column 21 shown in FIG. 1C, and in all columns 21 of MUMIT-CCD 20, vertically downwards by two storage capacitors in a direction indicted by a block arrow 203. As a result of the downward transfer of photocharge in column 21, photocharge in the bottommost capacitor 44 in FIG. 1C, which was accumulated during the first exposure period of MUMIT-CCD 20, is deposited into a readout capacitor 24. Simultaneously with deposit of photocharge from the bottommost capacitor 44 to the readout capacitor 24 in example column 21, photocharge from the bottommost storage capacitor 44 in all columns 21 in MUMIT-CCD 20 may be deposited in readout capacitors 24 of row 23.

Following deposit of the photocharge from the bottommost storage capacitors 44 in columns 21 into readout capacitors 24 of row 23, controller 26 transfers the amounts of photocharge in the readout capacitors horizontally along readout row 23 from readout capacitor 24 to readout capacitor 24 to sequentially deposit each photocharge into readout capacitor 27. The readout amplifier converts each amount of photocharge deposited in readout capacitor 27 to a readout voltage which is stored as data in a first frame of MUMIT-CCD 20 that may be used to provide the first image of the scene. Readout voltages for all of the bottommost storage capacitors 44 provides data for a row of image pixels in the first image of the scene. Horizontal transfer of photocharge in readout capacitor 24 comprised in example column 21 shown in FIG. 1D is indicated by a block arrow 204 and may be accomplished by any suitable application of voltages known in the art to the readout capacitors.

Applying voltage Sequence A to storage capacitors 41-45 a second time, deposits photocharge in the bottommost storage capacitors 42 of MUMIT-CCD 20, which was accumulated during the second exposure period of MUMIT-CCD 20, into readout capacitors 24 and transferring the deposited photocharge to readout amplifier 25 for conversion to readout voltages, provides data for a second frame of MUMIT-CCD 20 that may be used to provide the second image of the scene. Repeating the vertical and horizontal transfers of photocharge described above until all pixels 30 in MUMIT-CCD 20 are read out, provides first and second frames of the photosensor useable to provide the first and second images of the scene.

It is noted that a time required to readout a photosensor after exposure to light from a scene may be relatively long. For example, a practical readout time for a 1 megapixel photosensor may be as long as 25-30 ms (milliseconds). Therefore a photosensor operating in a conventional mode to acquire two images of a scene by reading out the photosensor following each exposure period to light from the scene, may reasonably be expected to acquire the second image delayed from the first image by a relatively long time delay that might be as much as 30 ms. On the other hand a MUMIT-CCD photosensor 20 operating in the holistic mode described above, initiates a second exposure period substantially at a time at which the first exposure period ends, or at most following a delay that is less than a time it requires controller 26 to transfer photocharge in a pixel 30 from storage capacitor 42 to storage capacitor 44. As a result, when operating in the holistic mode MUMIT-CCD 20 sequentially acquires photocharge for two frames of a scene and thereby two images of the scene in rapid succession with a delay between images less than about 2 ms.

FIGS. 2A-2E illustrate MUMIT-CCD 20 operating in an equal partition mode to acquire four images of a scene in rapid succession responsive to light from the scene incident on the photosensor during four exposure periods, in accordance with an embodiment of the disclosure. It is noted that exposure periods in one or more pairs of the four exposure periods may have different durations. In the equal partition mode shown in FIGS. 2A-2E, controller 26 allocates a first half of pixels 30 in MUMIT-CCD 20 to register light from the scene and a second non-overlapping half of the pixels to store photocharge registered by pixels in the first half. Each FIG. 2A-2E schematically shows an example column 21 of pixels in MUMIT-CCD 20 photosensor shown in FIG. 1A during operation in the equal partition mode at a different stage of generation and processing photocharge to register light from a scene and acquire four images of the scene in relatively rapid succession. The first half of pixels 30 allocated to register light is indicated by a numeral 91 and the second half of pixels 30 allocated to store photocharge generated by pixels 30 in half 91 is indicated by a dotted boundary 92, which numeral 92 is used to reference the second half.

Figures 2A, 2B, 2C:
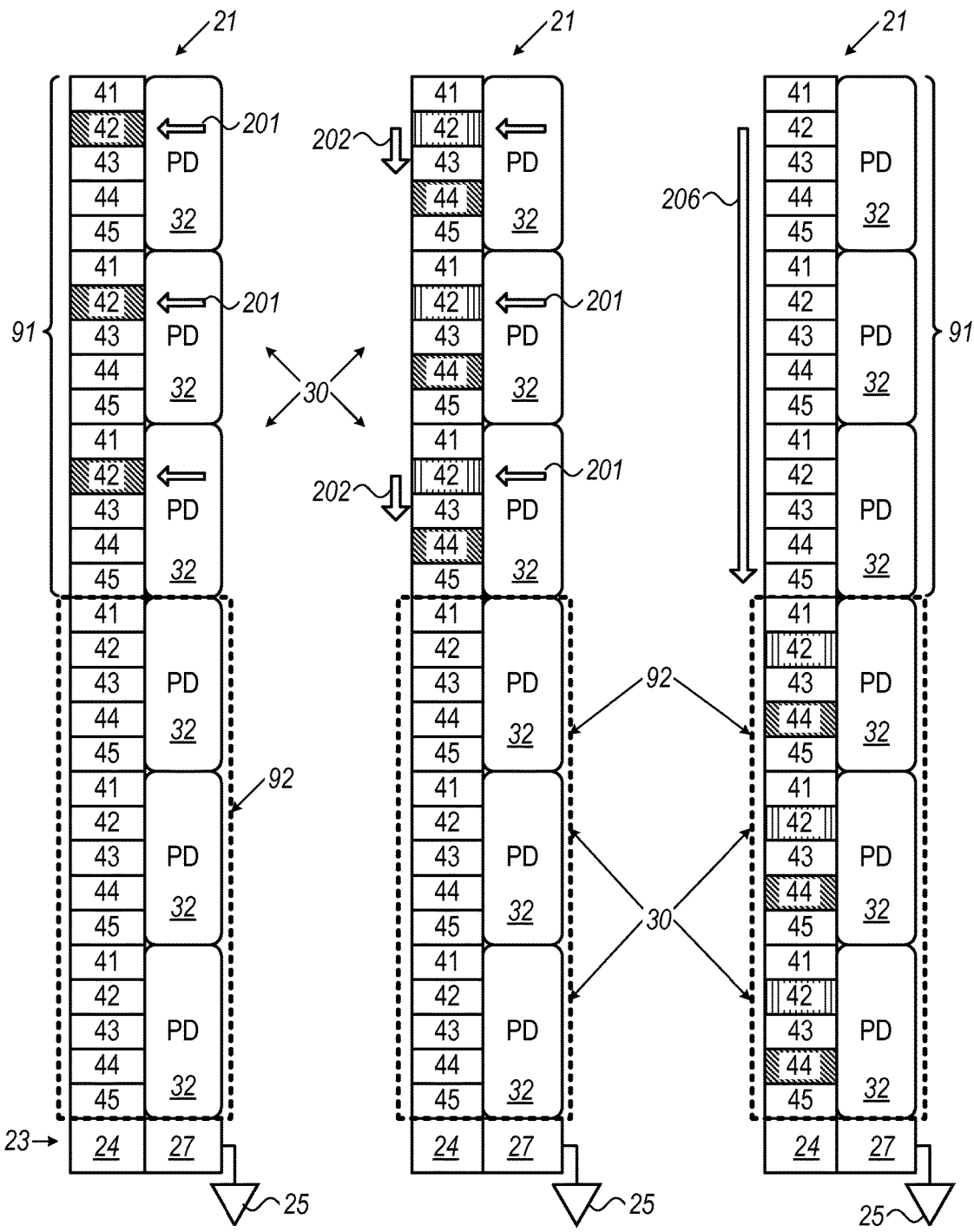

Controller 26 controls pixels 30 in first half 91 of pixels 30 similarly to the manner in which controller 26 controls pixels 30 when operating MUMIT-CCD 20 in the holistic mode show in FIGS. 1B-1D to acquire two images of a scene. During a first exposure period as schematically indicated in FIG. 2A, controller 26 applies voltage to electrodes only in pixels 30 comprised in first half 91 to generate and accumulate photocharge in storage capacitors 42 for the first of the four images of the scene. Storage capacitors 42 in FIG. 2A are shaded by a first hatching to indicate photocharge accumulated for the first image. Controller 26 then shifts photocharge accumulated in storage capacitors 42 during the first exposure period to storage capacitors 44, optionally applying to storage capacitors 41-45 a sequence of voltage configurations shown in TABLE A to accomplish the shift. During a second exposure period, as schematically indicted in FIG. 2B, controller 26 controls pixels 30 in first half 91 to accumulate photocharge in storage capacitors 42 for the second of the four images. Photocharge accumulated in storage capacitors 42 during the second exposure period is indicated by shading of storage capacitors with a hatching different from that representing photocharge accumulated during the first exposure period.

At an end of the second exposure period, pixels 30 in first half 91 have accumulated photocharge for first and second images of the scene, and pixels 30 in second half 92 are optionally devoid of photocharge and controller 26, as indicated by a block arrow 206 vertically transfers the photocharge accumulated in the pixels in the first half to pixels 30 in second half 92. Optionally, controller 26 accomplishes the vertical transfers of the photocharge by applying voltage Sequence B to transfer gates 41-45 in pixels 30. FIG. 2C schematically shows example column 21 after photocharge stored in storage capacitors 42 and 44 in first half 91 has been transferred to pixels 30 in second half 92.

Following transfer of photocharge to pixels 30 in second half 92, controller 26 operates pixels 30 in first half 91 to accumulate photocharge during third and fourth exposure periods in storage capacitors 42 and 44 for third and fourth images respectively of the scene. Quantities of photocharge accumulated by pixels 30 in first half 91 during the third and fourth exposure periods are indicated by shading of storage capacitors with unique hatchings. FIG. 2D schematically shows example column 21 after controller 26 has controlled MUMIT-CCD 20 to accumulate photocharge during four consecutive exposure periods and is about to readout the photocharge. FIG. 2E shows example column 21 after controller 26 has begun to readout the photocharge and amounts of photocharge shown in example column 21 have been transferred downward towards row 23 of readout pixels 24 by two storage capacitors. Optionally, controller 26 applies voltage configurations Sequence B to transfer vertically downward towards row 23.

Operating in the equal partition mode MUMIT-CCD 20 accumulates photocharge for four frames of a scene and thereby four images of the scene during four consecutive exposure periods for which there is substantially no delay between an end of one exposure period and beginning of a next exposure period. The photocharge accumulated during all four exposure periods is read out in a single readout period.

FIGS. 3A-3E schematically illustrate the MUMIT-CCD 20 operating in a ⅔-⅓ compression mode, for which controller 26 allocates two thirds of the pixels to generate photocharge responsive to light from a scene, and one third of the pixels to store in a compressed format the photocharge generated by the two thirds of the pixels. Each FIG. 3A-3E schematically shows an example column 21 of pixels 30 in MUMIT-CCD 20 during operation in the ⅔-⅓ compression mode at a different stage of generation of photocharge to register light from a scene incident on the photosensor and acquire three images of the scene in relatively rapid succession. The ⅔ portion of pixels 30 allocated to register light is indicated by a numeral 93 and the ⅓ portion of pixels 30 allocated to store photocharge generated by pixels in ⅔ portion 93 is indicated by a dotted boundary labeled 94, which numeral 94 is used to reference the ⅓ portion. A boundary between ⅔ portion 93 and ⅓ portion 94 is indicated by a line 130. An upper boundary pixel 30 that lies in ⅔ portion and is adjacent to boundary 130 is labeled 131. A lower boundary pixel 30 that lies in ⅓ portion 94 and is adjacent to boundary 130 is labeled 132.

Figure 3A:
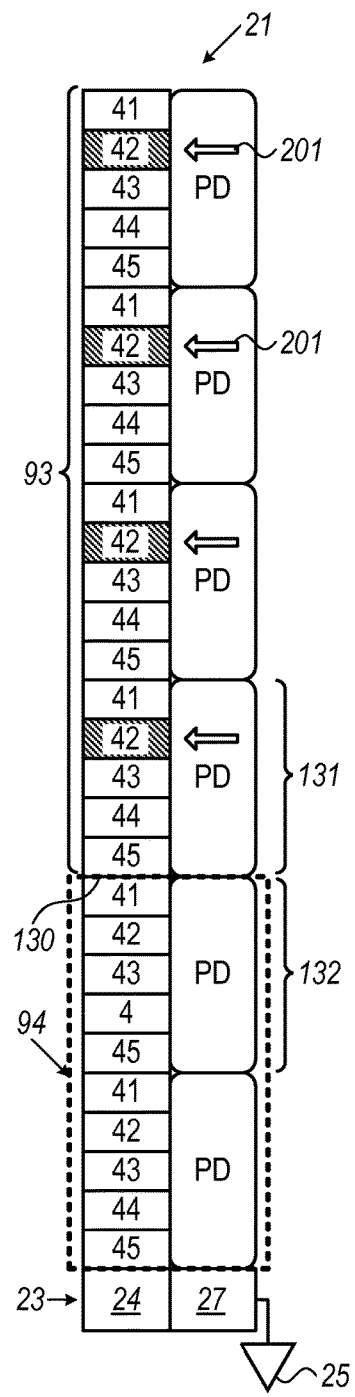
FIGS. 3A-3E schematically illustrate operation of the MUMIT-CCD in a partition mode in which two thirds of the pixels generate photocharge responsive to light from a scene, and one third of the pixels store the photocharge generated by the two thirds of the pixels in a compressed format to acquire three images of a scene in relatively rapid succession, in accordance with an embodiment of the invention.
Figure 3B:
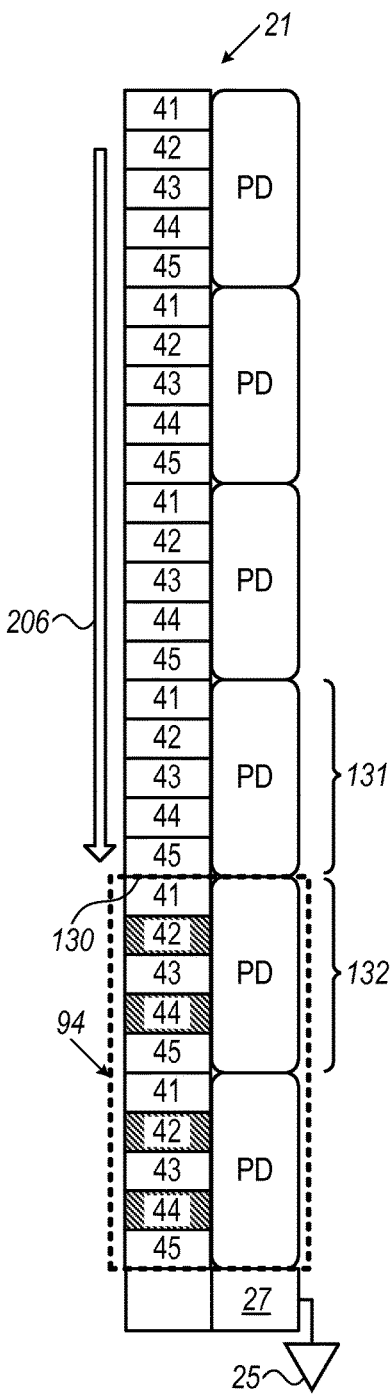

In FIG. 3A controller 26 operates pixels in ⅔ portion 93 to accumulate photocharge in storage capacitors 42 during a first exposure period of MUMIT-CCD 20 similarly to the manner in which controller 26 operates MUMIT-CCD 20 in the holistic and equal partition modes described above to accumulate photocharge for a first image of a scene. In FIG. 3B the controller applies a sequence of voltage configuration to storage capacitors 41-45 to transfer, as indicated by a block arrow 206, photocharge accumulated during the first exposure period to storage capacitors in ⅓ portion 94 of pixels 30 and store the transferred photocharge in storage capacitors 41-45 in the pixels in ⅓ portion 94 in a compressed format shown in FIG. 3B.

Transfer and compression may be performed by applying, optionally voltage Sequence A to storage capacitors 41-45 in all pixels 30 in example column 21 (and in MUMIT-CCD 20) to vertically transfer the photocharge downwards by a "distance" of five storage capacitors towards readout pixel row 23. Application of Sequence A transfers photocharge in a storage capacitor 42 of boundary pixel 131 into storage capacitor 42, of boundary pixel 132. Voltage Sequence A may then repeatedly be applied only to storage capacitors 41-45 in ⅔ portion 93 to transfer photocharge in ⅔ portion 93 downwards by three storage capacitors so that photocharge is located in storage capacitor 45 of border pixel 131. Voltage configurations Series B may then be applied to all pixels 30 to move all the photocharge in MUMIT-CCD 20 vertically downwards by two storage capacitors. Voltage Sequence A may then be applied to all pixels 30 in ⅔ portion 93 to move photocharge in the ⅔ portion downwards two storage capacitors. Sequence B may then be applied to move all photocharge in MUMIT-CCD 20 three storage capacitors down. The application of Sequence A and Sequence B may then be repeated until all photocharge in ⅔ portion 93 is transferred to ⅓ portion 94 as schematically shown in FIG. 3B.

Figure 3C:
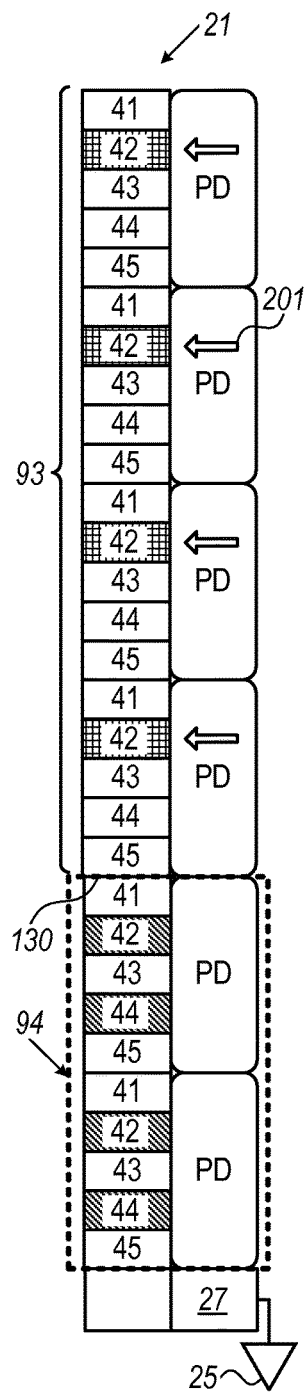
Figure 3D:
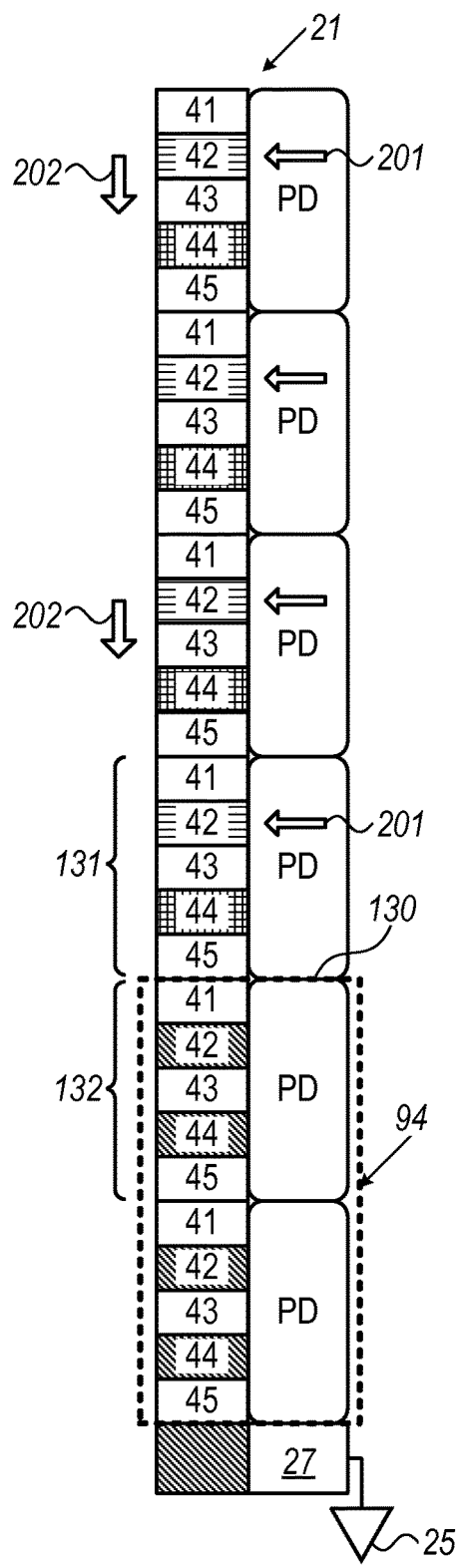
Figure 3E:
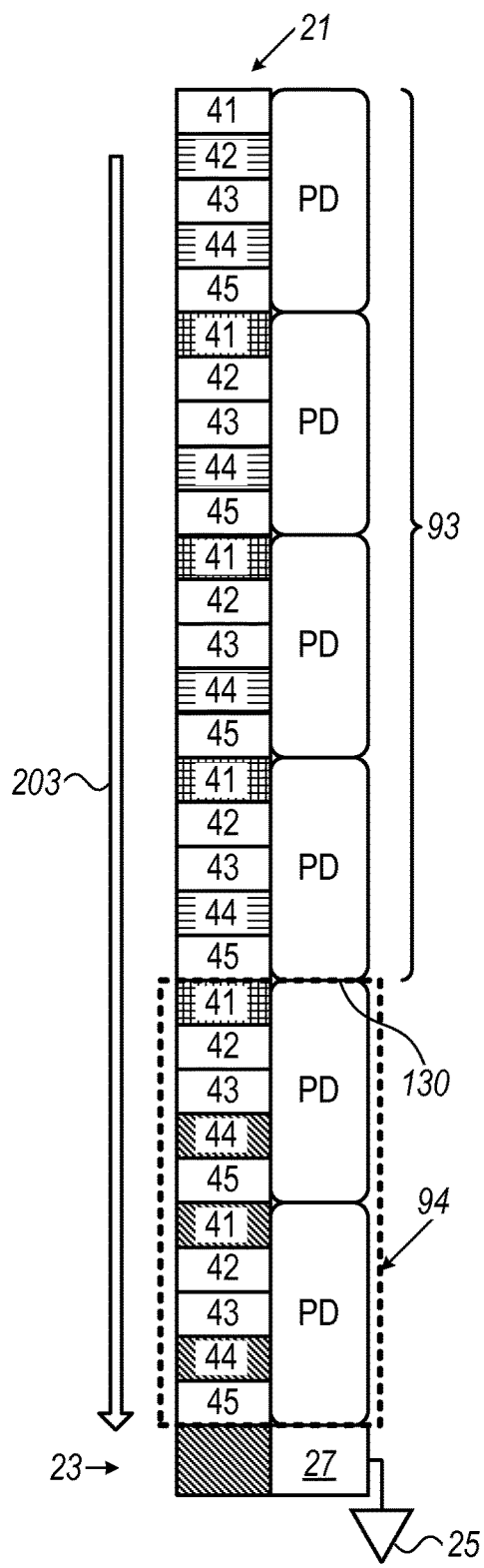

Following transfer and compression of photocharge in ⅓ portion 94, controller 26 operates pixels in ⅔ portion 93 to accumulate photocharge during second and third exposure periods in storage capacitors 44 and 42 respectively as schematically shown in FIGS. 3C and 3D. At the end of the third exposure period, as shown in FIG. 3D, photocharge from the first exposure period is located in pixels 30 in ⅓ portion 94 and photocharge from the second and third exposure periods is located in ⅔ portion 93 and controller 26 operates to readout all the accumulated photocharge. FIG. 3E schematically shows an initial step in reading out MUMIT-CCD 20 in the ⅔-⅓ compression mode. It is noted that exposure periods in one or more pairs of the three exposure periods during operation in the ⅔-⅓ compression mode may have different durations.

FIGS. 4A-4F schematically illustrate MUMIT-CCD 20 operating in a ⅔-⅓ partial readout mode, for which controller 26 allocates two thirds of the pixels to generate photocharge responsive to light from a scene, one third of the pixels to store the generated photocharge, and reads out pixels in the one third between exposure periods to acquire four images of the scene in relatively rapid succession. Each FIG. 4A-4F schematically shows an example column 21 of pixels 30 in MUMIT-CCD 20 during operation in the ⅔-⅓ partial readout mode at a different stage of generation of photocharge to register light from a scene incident on the photosensor and acquire four images of the scene in relatively rapid succession. The ⅔ portion of pixels 30 allocated to register light is indicated by a numeral 93 and the ⅓ portion of pixels 30 allocated to store photocharge generated by pixels in ⅔ portion 93 is indicated by a dotted boundary labeled 94.

Figures 4A, 4B, 4C:
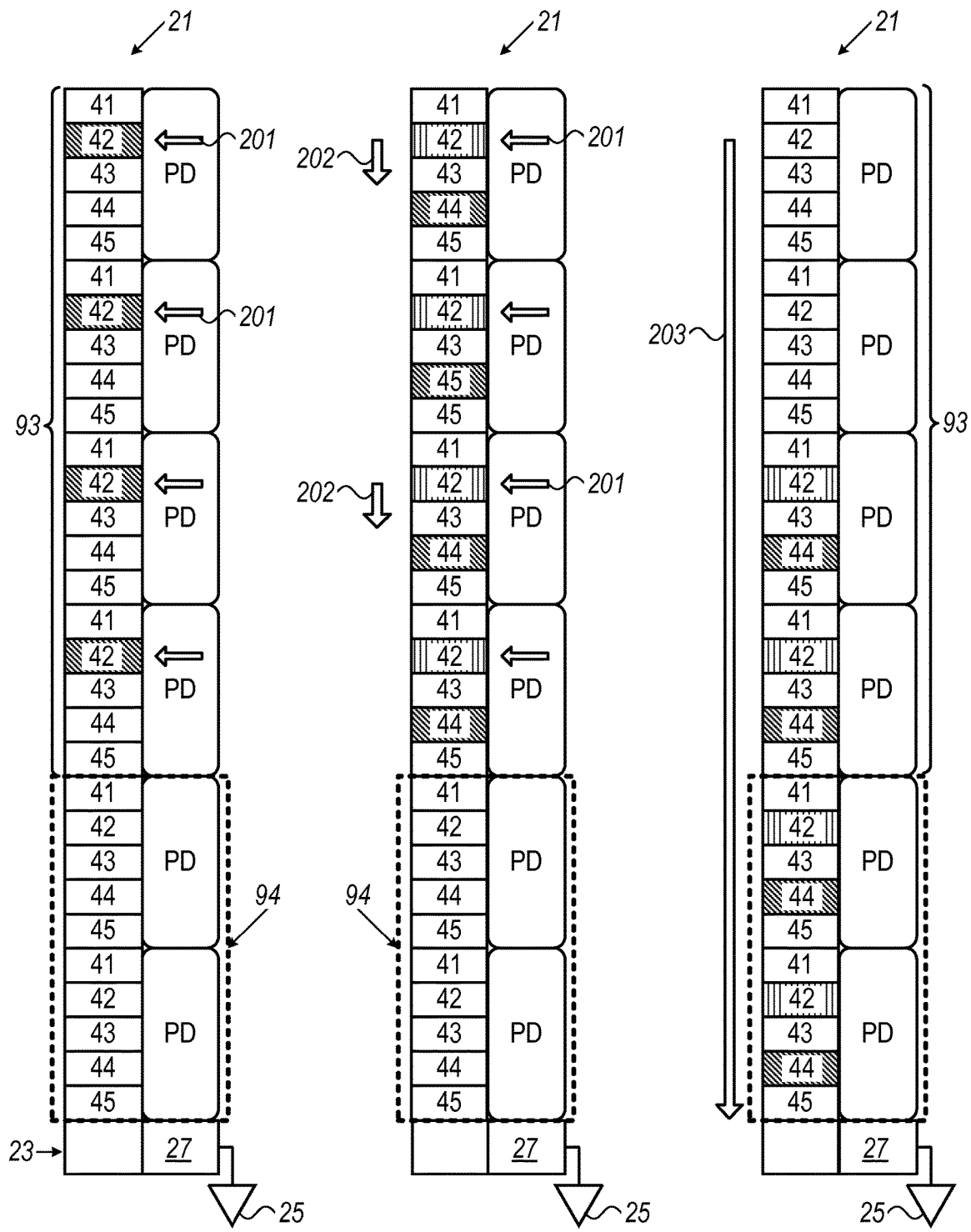
FIGS. 4A-4F schematically illustrate operation of the MUMIT-CCD in another partition mode in which two thirds of the pixels generate photocharge responsive to light from a scene, and one third of the pixels store the photocharge generated by the two thirds of the pixels in a compressed format to acquire four images of a scene in relatively rapid succession, in accordance with an embodiment of the invention.
Figure 4D:
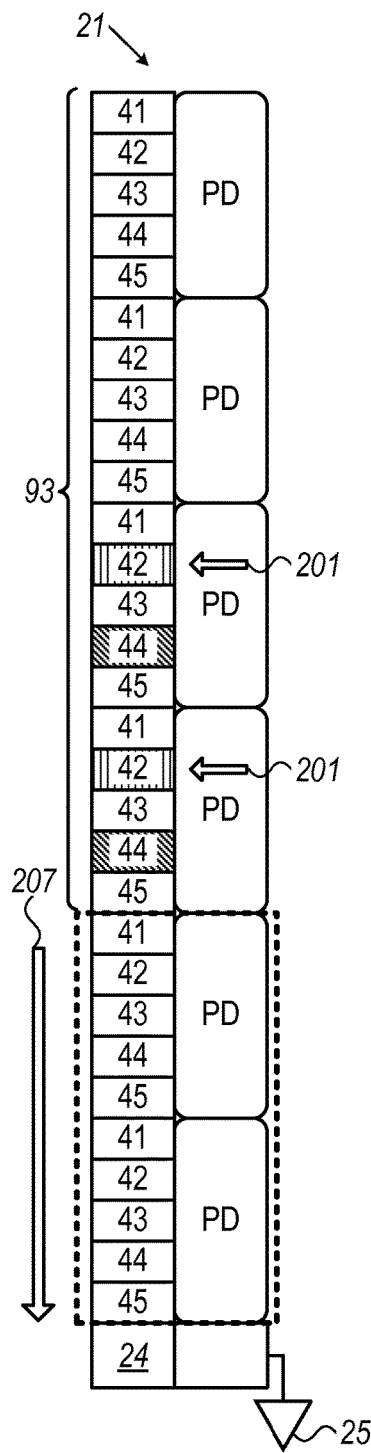

FIGS. 4A and 4B schematically illustrate controller 26 controlling pixels 30 in ⅔ portion 93 to accumulate photocharge during first and second exposure periods to provide two images of the scene in a manner similar to that shown and discussed with reference to FIGS. 2A and 2B. At the end of the second exposure period, controller 26 transfers, as indicated by block arrow 203, optionally without compression, one half of the photocharge accumulated during the first and second exposure periods to pixels 30 in ⅓ portion 94. FIG. 4C schematically shows example pixel column 21 after photocharge has been transferred without compression to pixels 30 in ⅓ portion. Controller 26 then reads out, as indicated by a block arrow 207, pixels 30 in ⅓ portion 94 providing half the data for frames useable to provide first and second images of the scene and emptying out the pixels as schematically shown in FIG. 4D.

Figure 4E:
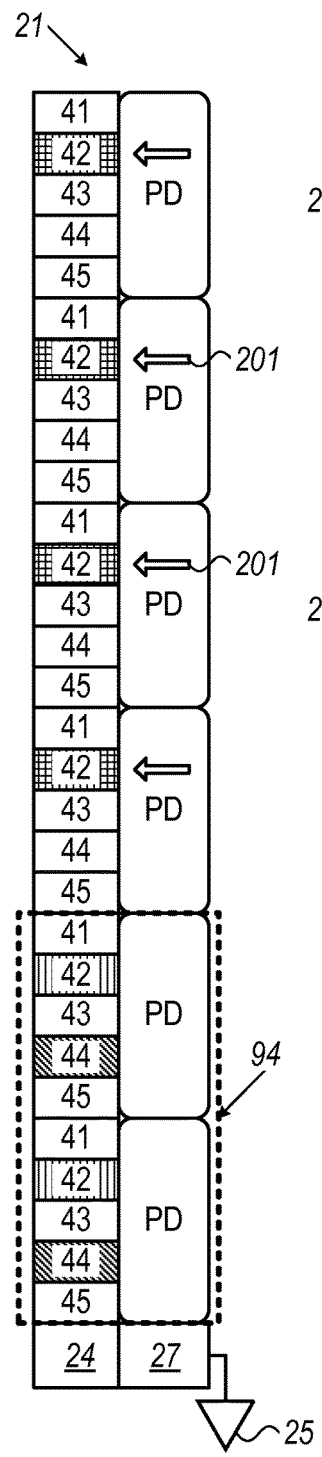
Figure 4F:
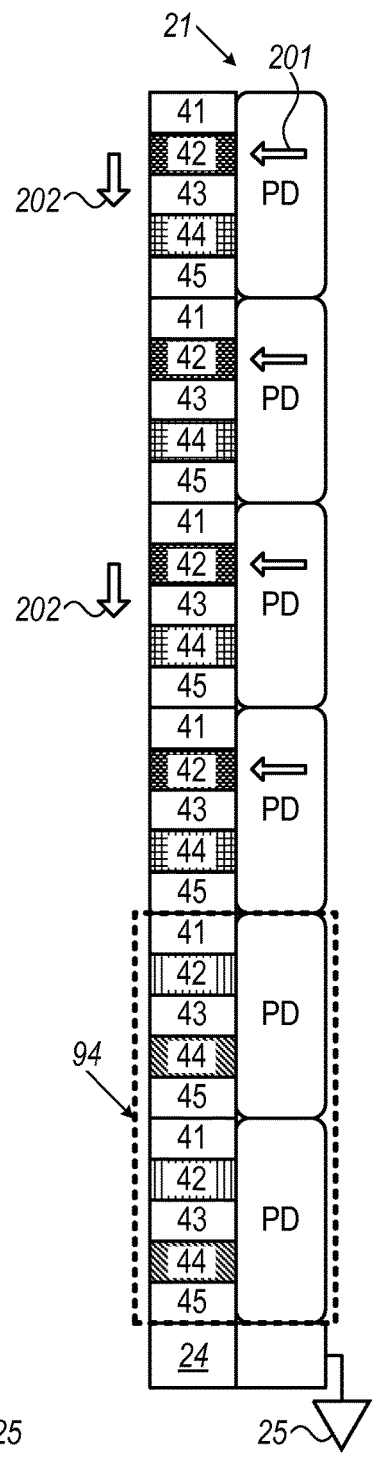

After reading out the pixels in ⅓ portion 94, as schematically shows in FIG. 4E, controller 26 transfers the remaining photocharge accumulated during the first and second exposure periods to pixels 30 in ⅓ portion 94 and operates pixels 30 in ⅔ portion 93 to accumulate photocharge in storage capacitors 42 of the pixels during a third exposure period to light from the scene. The controller transfers the photocharge accumulated in storage capacitors 42 during the third exposure period to storage capacitors 44 in pixels 30 in ⅔ portion 93 and controls the pixels to accumulate photocharge in storage capacitors 42 during a fourth exposure period to light from the scene. FIG. 4E schematically shows example column 21 of pixels 30 at the end of the fourth exposure period having photocharge accumulated during the third and fourth exposure periods stored in storage capacitors 42 and 44 of pixels 30 in ⅔ portion 93 and photocharge accumulated during the first and second exposure periods from some of pixels 30 in ⅔ portion 93 stored in pixels 30 in ⅓ portion 94. Controller 26 reads out the photocharge shown in FIG. 4E to provide frames for third and fourth images of the scene and complete frames for the first and second images.

Operating in the ⅔-⅓ partial readout mode, MUMIT-CCD 20 acquires four images of a scene in relatively rapid succession responsive to light from the scene respectively registered during four exposure periods. Of the four exposure periods, the second and fourth exposure periods begin with substantially no delay following times at which the first and third exposure periods respectively, end, and the third exposure period begins at a time delayed from a time at which the second exposure period ends by one third of a readout period of MUMIT-CCD 20. It is noted that exposure periods in one or more pairs of the four exposure periods during operation in the ⅔-⅓ partial readout mode may have different durations.

It is noted that a MUMIT-CCD photosensor in accordance with an embodiment of the disclosure, such as MUMIT-CCD 20 described above, may advantageously be comprised as a component in any of various cameras that may find it advantageous to acquire a plurality of images of a scene, optionally under different exposure periods. For example, a MUMIT-CCD may be comprised in a time of flight (TOF) range camera, which typically acquires three or more images of a scene during respective exposure periods having different durations to determine distances to features in the scene. A MUMIT-CCD may be used in a high dynamic range (HDR) camera, which acquires a plurality of images of a scene using different exposure periods and combines the images to produce an image exhibiting an enhanced range of luminosity. In an embodiment of the disclosure a camera comprising a MUMIT-CCD may operate to provide functionalities of a TOF range camera and an HDR camera to provide range images keyed to high dynamic range luminosity images of a scene.

There is therefore provided in accordance with an embodiment of the disclosure a multimode interline charge coupled device (MUMIT-CCD) photosensor operable to image a scene, the MUMIT-CCD comprising: an array of light sensitive pixels each configured to accumulate photocharge responsive to light incident on the pixel; and a controller configured to operate the array in a partition mode in which the controller allocates a first portion of the pixels to accumulate photocharge responsive to light from a scene incident on the array during a plurality of exposure periods and allocates a second portion of the pixels to store photocharge accumulated by pixels in the first portion to provide a plurality of images of the scene greater than two. Optionally, the controller is configured to operate the array in a holistic mode in which the controller control all the light sensitive pixels to accumulate photocharge responsive to light from a scene incident on the array during at least one exposure period to provide an image of the scene. Additionally or alternatively the controller may be configured to read out photocharge generated during each of the exposure periods during a same readout period.

In an embodiment of the disclosure, the first and second portions comprise a same number of the pixels. Optionally, the number of the plurality of exposure periods is equal to four. Optionally, the controller is configured to transfer photocharge accumulated by pixels in the first portion during first and second exposure periods of the four exposure periods for storage in pixels in the second portion. The controller is optionally, configured to readout photocharge accumulated during all of the four exposure periods during the same readout period. Optionally, at a time at which the same readout period begins, photocharge accumulated during third and fourth exposure periods of the four exposure periods is located in pixels in the first portion.

In an embodiment of the disclosure, the first portion of the pixels comprises ⅔ of the pixels and the second portion of the pixels comprises ⅓ of the pixels. Optionally, the number of the plurality of exposure periods is equal to three. Optionally, the controller transfers the photocharge accumulated by pixels in the first portion during a first of the three exposure periods to pixels in the second portion and stores the transferred photocharge in the pixels in the second portion in a compressed format. The controller may be configured to readout photocharge accumulated during all of the three exposure periods during the same readout period to provide three images of the scene. At a time at which the same readout period begins, photocharge accumulated during second and third exposure periods of the three exposure periods may be located in pixels in the first portion.

In an embodiment of the disclosure, the number of the plurality of exposure periods is equal to four. Optionally, the controller is configured to: between second and third exposure periods of the four exposure periods transfer photocharge accumulated by a first half of the pixels in the first portion to the pixels in the second portion; readout the photocharge transferred to the pixels in the second portion; transfer photocharge accumulated by a second half of the pixels in the first portion to the pixels in the second portion; and following a fourth exposure period of the four exposure periods readout in the same readout period the photocharge accumulated by the second half of the pixels transferred to pixels in the second portion, and photocharge accumulated by pixels in the first portion during the third and fourth exposure periods.

In an embodiment of the disclosure, exposure periods in a pair of exposure periods chosen from the plurality of exposure periods have different durations.

In an embodiment of the disclosure, each of the light sensitive pixels in the array comprises a photodiode configured to generate photocharge responsive to light incident on the pixel and a plurality of storage capacitors configured to receive and accumulate photocharge generated by the photodiode. Optionally, the number of the plurality of storage capacitors is equal to five.

There is further provided a camera comprising: a MUMIT-CCD in accordance with an embodiment of the disclosure; and optics that collects and focuses light from a scene onto the array of light sensitive pixels. The camera may, by way of example, be a time of flight range camera or a high dynamic range imaging camera.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments.

The invention claimed is:

1. A multimode interline charge coupled device (MUMIT-CCD) photosensor operable to image a scene, the MUMIT-CCD comprising:
   an array of light sensitive pixels each configured to accumulate photocharge responsive to light incident on the pixel; and
   a controller configured to operate the array in a partition mode in which the controller allocates a first portion of the pixels in the array pixels to accumulate photocharge for a first image and simultaneously store photocharge for a second image of a scene responsive to light from the scene incident on the array during a plurality of exposure periods and allocates a second portion of the pixels in the array to store photocharge accumulated by pixels in the first portion to provide a plurality of images of the scene greater than two.

2. The MUMIT-CCD according to claim 1 wherein the controller is configured to operate the array in a holistic mode in which the controller control all the light sensitive pixels to accumulate photocharge responsive to light from a scene incident on the array during at least one exposure period to provide an image of the scene.

3. The MUMIT-CCD according to claim 1 wherein the controller is configured to read out photocharge generated during each of the exposure periods during a same readout period.

4. The MUMIT-CCD according to claim 1 wherein the first and second portions comprise a same number of the pixels.

5. The MUMIT-CCD according to claim 4 wherein the number of the plurality of exposure periods is equal to four.

6. The MUMIT-CCD according to claim 5 wherein the controller is configured to transfer photocharge accumulated by pixels in the first portion during first and second exposure periods of the four exposure periods for storage in pixels in the second portion.

7. The MUMIT-CCD according to claim 6 wherein the controller is configured to readout photocharge accumulated during all of the four exposure periods during the same readout period.

8. The MUMIT-CCD according to claim 7 wherein at a time at which the same readout period begins, photocharge accumulated during third and fourth exposure periods of the four exposure periods is located in pixels in the first portion.

9. The MUMIT-CCD according to claim 1 wherein the first portion of the pixels comprises ⅔ of the pixels in the array and the second portion of the pixels comprises ⅓ of the pixels in the array.

10. The MUMIT-CCD according to claim 9 wherein the number of the plurality of exposure periods is equal to three.

11. The MUMIT-CCD according to claim 10 wherein the controller transfers the photocharge accumulated by pixels in the first portion during a first of the three exposure periods to pixels in the second portion and stores the transferred photocharge in the pixels in the second portion in a compressed format.

12. The MUMIT-CCD according to claim 11 wherein the controller is configured to readout photocharge accumulated during all of the three exposure periods during the same readout period to provide three images of the scene.

13. The MUMIT-CCD according to claim 12 wherein at a time at which the same readout period begins, photocharge accumulated during second and third exposure periods of the three exposure periods is located in pixels in the first portion.

14. The MUMIT-CCD according to claim 9 wherein the number of the plurality of exposure periods is equal to four.

15. The MUMIT-CCD according to claim 14 wherein the controller is configured to:
   between second and third exposure periods of the four exposure periods transfer photocharge accumulated by a first half of the pixels in the first portion to the pixels in the second portion;
   readout the photocharge transferred to the pixels in the second portion;
   transfer photocharge accumulated by a second half of the pixels in the first portion to the pixels in the second portion; and
   following a fourth exposure period of the four exposure periods readout in the same readout period the photocharge accumulated by the second half of the pixels transferred to pixels in the second portion, and photocharge accumulated by pixels in the first portion during the third and fourth exposure periods.

16. The MUMIT-CCD according to claim 1 wherein exposure periods in a pair of exposure periods chosen from the plurality of exposure periods have different durations.

17. The MUMIT-CCD according to claim 1 wherein each of the light sensitive pixels in the array comprises a photodiode configured to generate photocharge responsive to light incident on the pixel and a plurality of storage capacitors configured to receive and accumulate photocharge generated by the photodiode.

18. The MUMIT-CCD according to claim 17 wherein the number of the plurality of storage capacitors is equal to five.

19. A camera comprising:
   a MUMIT-CCD in accordance with claim 1;
   and optics that collects and focuses light from a scene onto the array of light sensitive pixels.

20. A camera according to claim 19 wherein the camera is a time of flight range camera or a high dynamic range imaging camera.

* * * * *